United States Patent [19]

Balakrishnan

[11] Patent Number: 5,285,369
[45] Date of Patent: Feb. 8, 1994

[54] SWITCHED MODE POWER SUPPLY INTEGRATED CIRCUIT WITH START-UP SELF-BIASING

[75] Inventor: Balu Balakrishnan, Saratoga, Calif.
[73] Assignee: Power Integrations, Inc., Mountain View, Calif.
[21] Appl. No.: 938,703
[22] Filed: Sep. 1, 1992
[51] Int. Cl.⁵ .......................................... H02M 7/5375
[52] U.S. Cl. .......................................... 363/49; 363/21; 363/147; 323/901
[58] Field of Search .................. 363/20, 21, 49, 147; 323/901; H02M 3/28, 3/335, 7/5375

[56] References Cited

U.S. PATENT DOCUMENTS

| 4,318,168 | 3/1982 | Faxon | 363/21 |
| 4,845,605 | 7/1989 | Steigerwald | 363/21 |
| 5,140,510 | 8/1992 | Myers | 363/20 |

FOREIGN PATENT DOCUMENTS

| 0161868 | 7/1988 | Japan | H02M 003/280 |
| 0107654 | 4/1989 | Japan | H02M 003/280 |
| 0157272 | 6/1989 | Japan | H02M 003/280 |
| 3265465 | 11/1991 | Japan | H02M 3/28 |
| 3289352 | 12/1991 | Japan | H02M 3/28 |

Primary Examiner—Emanuel T. Voeltz
Assistant Examiner—Thomas M. Dougherty
Attorney, Agent, or Firm—Thomas E. Schatzel

[57] ABSTRACT

An embodiment of the present invention is a switching power supply that includes a full-wave bridge rectifier to rectify incoming AC line voltage, a transformer having a primary winding and two secondary windings and a switched mode power supply chip that includes an integrated high voltage power MOSFET with a low voltage tap in the drift region. The MOSFET controls power switching of the primary winding of the transformer and has a high voltage present during initial power-up. This high voltage is dropped across the JFET part of the MOSFET and supplies a regulator with power either temporarily or continuously to operate a pulse width modulator in the chip that controls the switching of the MOSFET.

6 Claims, 2 Drawing Sheets

SWITCHED MODE POWER SUPPLY INTEGRATED CIRCUIT WITH START-UP SELF-BIASING

BACKGROUND OF THE INVENTION

1. Field of the Invention

The present invention relates to electronic switching power supplies and specifically to the integrated circuit devices used in switching power supplies.

2. Description of the Prior Art

The cost to manufacture a power supply is a principal concern in selecting power supply types to be used in particular applications and the components selected to construct them. Switching power supplies have become cost competitive with much simpler linear power supplies because integrated circuit (IC) technology has advanced such that a majority of the complex switch mode circuits can be integrated on a single chip. As a rule of thumb, the fewer necessary pins on an IC package the lower will be the cost. Fewer support components and less expensive peripheral components also will reduce the overall cost of a power supply.

FIG. 1 illustrates a prior art power supply 10 that includes a full-wave bridge rectifier 12, a transformer 14 with a primary winding 16 and a pair of secondary windings 18 and 20, a switched mode power supply chip 22, a plurality of filter capacitors 24–27, a pair of diodes 28 and 30, and a high-voltage high-wattage resistor 32. The power to operate chip 22 is produced by secondary winding 20, diode 30 and capacitor 27 and is referred to as $V$bias. However, at power start-up, chip 22 will be without power because primary winding 16 will be open and no voltage will be induced into secondary winding 20 because chip 22 is not switching. To initiate such switching, a point with high-voltage DC is tapped on bridge rectifier 12 by resistor 32 and the current is filtered by capacitor 25. This tap will supply just enough current through resistor 32 to start chip 22. Unfortunately, resistor 32 must be a high-wattage type because significant amounts of power can be dissipated in the process of dropping the high voltage of the line to the low voltage required by chip 22. The waste of power is continuous, even after Vbias is available. This problem is particularly severe when input voltage range is wide (e.g., 80-275 VAC for universal operation). Given worst case design rules, resistor 32 has to be designed to provide the required start up current for the lowest expected voltage. Thus, at the highest expected voltage, resistor 32 must dissipate all the more power. To compound the problem, such high-wattage resistor types require extra space and air circulation.

FIG. 2 illustrates a prior art power supply 50 that is similar to power supply 10, except resistor 32 has been eliminated and chip 22 is replaced by a switched mode power supply chip 52. A voltage regulator internal to chip 52 allows the elimination of resistor 32 and includes a high voltage pre-regulator transistor 54, a series-pass transistor 56 and an undervoltage comparator 58. A resistor 60 biases transistor 54 on and during initial power-up, transistor 54 will pull transistor 56 up and supply power to a pulse width modulator (PWM) 62 that switches on a power output transistor 64. A voltage develops across primary winding 16 and induces a voltage in secondary winding 20 which supplies $V$bias. With $V$bias being supplied, comparator 58 operates to maintain transistor 54 off and no further high voltage power is required. Turning off high voltage pre-regulator 54 will save power after start up, but such a function is more expensive to implement, as it requires a high voltage transistor and extra pin with high voltage safety spacing.

The typical prior art high voltage transistor used in the pre-regulator of switch mode power supply chips is usually a relatively small device. The transistor's immunity to line transients is therefore limited. Thus, the pin associated with the transistor becomes a limiting factor for electrical static discharge (ESD) and safe operating area (SOA) rating of the switching regulator chip.

SUMMARY OF THE PRESENT INVENTION

It is an object of the present invention to provide a switched mode power supply chip which does not require a dedicated terminal pin for tapping high voltage during start-up.

Briefly, an embodiment of the present invention is a switching power supply that includes a full-wave bridge rectifier to rectify incoming AC line voltage, a transformer having a primary winding and two secondary windings and a switched mode power supply chip that includes an integrated high voltage power MOSFET with a low voltage tap in the drift region. The MOSFET controls power switching of the primary winding of the transformer and has a high voltage present during initial power-up. This high voltage is dropped across the JFET part of the MOSFET and supplies a regulator with power either temporarily or continuously to operate a pulse width modulator in the chip that controls the switching of the MOSFET.

An advantage of the present invention is that an integrated circuit is provided that does not require a high power bias resistor or a high voltage pre-regulator.

An advantage of the present invention is that an integrated circuit is provided that allows for a simple fully integrated power supply chip that requires few pins and external components.

A further advantage of the present invention is that an integrated circuit is provided that is economic.

Another advantage of the present invention is that an integrated circuit is provided that saves significant power compared to prior art power supplies that use a high-voltage dropping resistor.

An advantage of the present invention is that an integrated circuit is provided that allows for a fully integrated switching power supply with only one high-voltage pin, thus reducing electro-static discharge and safe operating area concerns over prior art implementations that require at least two high-voltage pins.

These and other objects and advantages of the present invention will no doubt become obvious to those of ordinary skill in the art after having read the following detailed description of the preferred embodiment which is illustrated in the various drawing figures.

IN THE DRAWINGS

DESCRIPTION OF THE EMBODIMENTS

Figure 3:
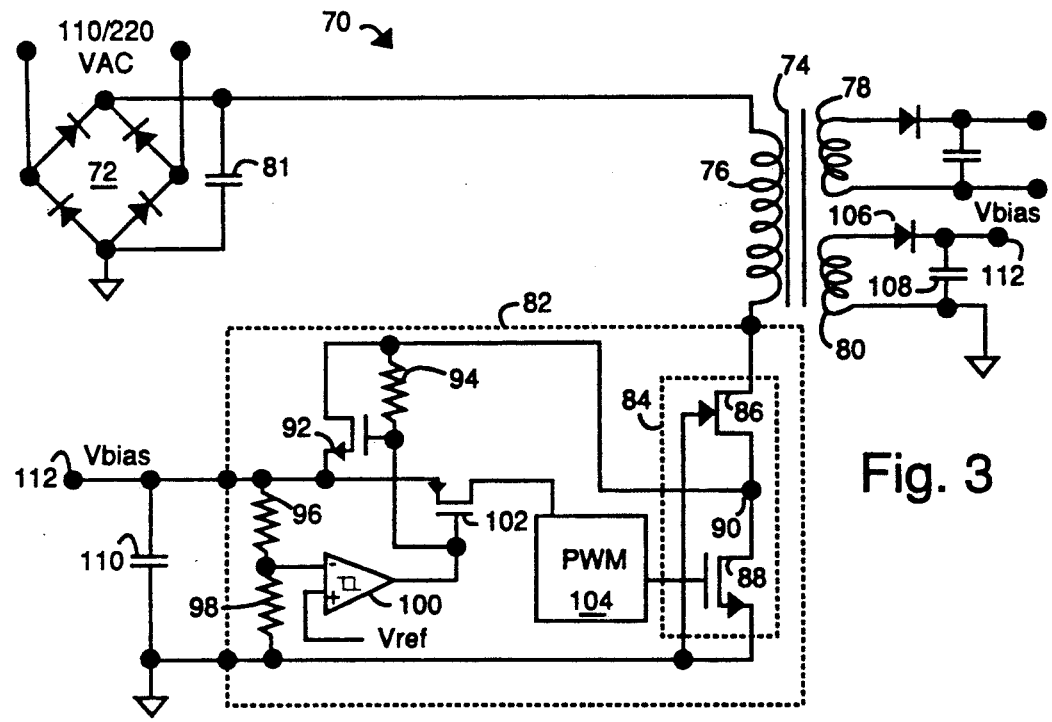
FIG. 3 is a schematic diagram of a switched mode power supply of the present invention.

FIG. 3 illustrates a power supply embodiment of the present invention, referred to by the general reference numeral 70. Power supply 70 comprises a full-wave bridge rectifier 72, a transformer 74 with a primary winding 76 and a pair of secondary windings 78 and 80, and a switched mode power supply chip 82. A high voltage power metal-oxide-semiconductor field effect transistor (MOSFET) 84 included within chip 82 comprises the equivalent of a junction field effect transistor (JFET) 86 and an insulated gate FET (IGFET) 88. A tap 90 provides low voltage to a regulator 92 and a resistor 94 when IGFET 88 is off.

MOSFET 84 is preferably similar to that described in U.S. Pat. No. 4,811,075, issued Mar. 7, 1989, to Klas H. Eklund. An insulated-gate, field-effect transistor and a double-sided, junction-gate field-effect transistor are connected in series on the same semiconductor chip to form a high-voltage MOS field effect transistor. An extended drain region is formed on top of a substrate of opposite conductivity material. A top layer of material, similar to the substrate, is formed by ion implantation through the same mask window as the extended drain region. The top layer covers only a middle part of the extended drain which has ends that meet with a silicon dioxide layer above. Current flow through the extended drain is controlled by the substrate and top layer which pinch-off the extended drain between them in a familiar field-effect fashion. The drift region of MOSFET 84 is used to drop the high line voltage to a low voltage for biasing chip 82. The junction between the JFET 86 and IGFET 88 at tap 90 is limited typically to 15-20 volts, due to the pinch-off action of JFET 86.

A pair of resistors 96 and 98 provide a voltage division for an undervoltage comparator 100 that controls a series pass transistor 102. The output of transistor 102 is an internal low-voltage supply to a pulse width modulator (PWM) 104. Once the internal low-voltage supply comes up, PWM 104 can control IGFET 88 on and off. This will cause transformer 74 to operate and induce a voltage into winding 80. A diode 106 and a pair of capacitors 108 and 110 will provide a smoothed, low-voltage DC referred to as $V_{bias}$, to a junction 112. JFET 86, which is pinched off, behaves like a current source and provides the current to charge up the bypass capacitor 110. $V_{bias}$ thereafter provides the source for the internal low-voltage supply and transistor 92 may be turned off. When the voltage at junction 112 reaches a required value, the voltage may be regulated by controlling the transistor 92.

As long as IGFET 88 is off each cycle for a time sufficient to provide enough current through JFET 86 to satisfy the average internal low voltage supply current requirement. Chip 82 could be continuously operated from the high voltage line, if that is desired. However, providing the chip supply current from the high voltage line for normal operation causes significant power loss in JFET 86 which can be avoided by using low voltage $V_{bias}$ derived from the transformer output. In this case transistor 92 is turned off when chip 82 is activated after the voltage at junction 112 reaches its operating voltage and the $V_{bias}$ is used to power chip 82. In order for this to work, capacitor 110 has to be large enough to provide the supply current without significant drop in voltage until the $V_{bias}$ comes up. The hysteresis on comparator 100 allows for some voltage subsidence across capacitor 110 during a transition period that exists between transistor 92 turning off and the rise of $V_{bias}$ to its normal operating level. If the voltage across capacitor 110 drops below the hysteresis value before $V_{bias}$ assumes its full value, comparator 100 will switch transistor 92 on and transistor 102 off, and the start-up cycle will repeat until $V_{bias}$ is available.

Figure 1:
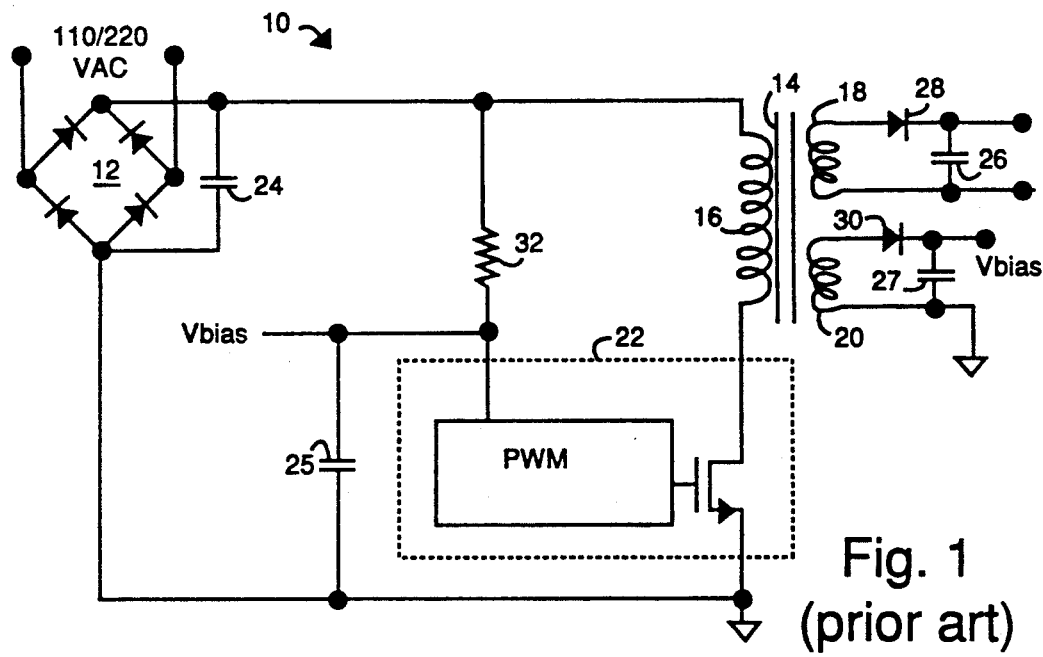
FIG. 1 is a schematic diagram of a prior art power supply that includes a high-voltage dropping resistor to generate power-up starting bias.
Figure 2:
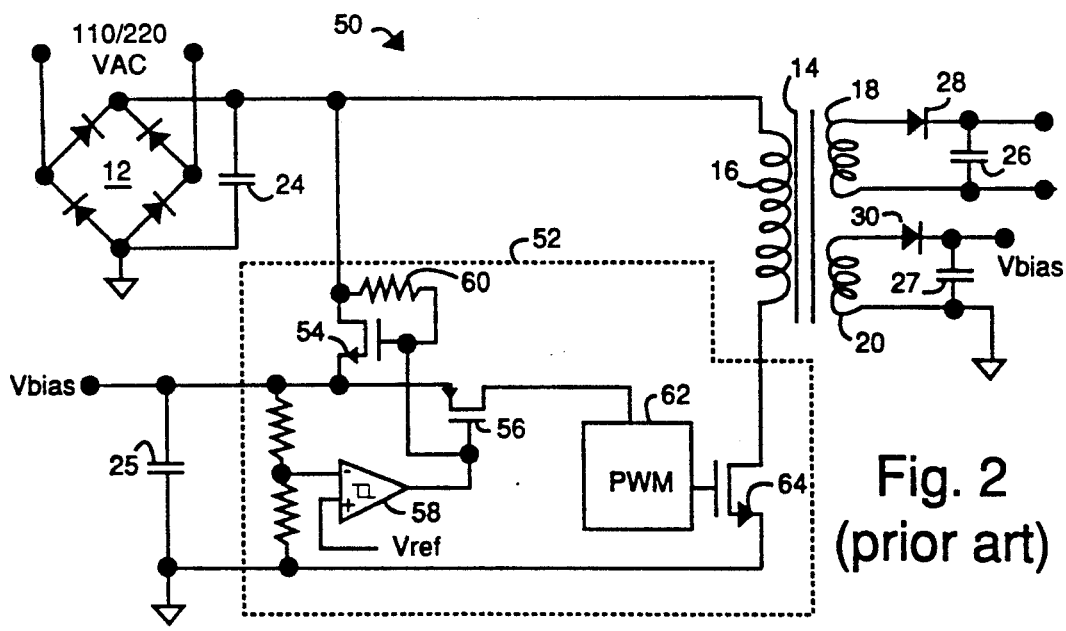
FIG. 2 is a schematic diagram of another prior art power supply that includes a high-voltage regulator transistor within a power supply chip to generate power-up starting bias.
Figure 4:
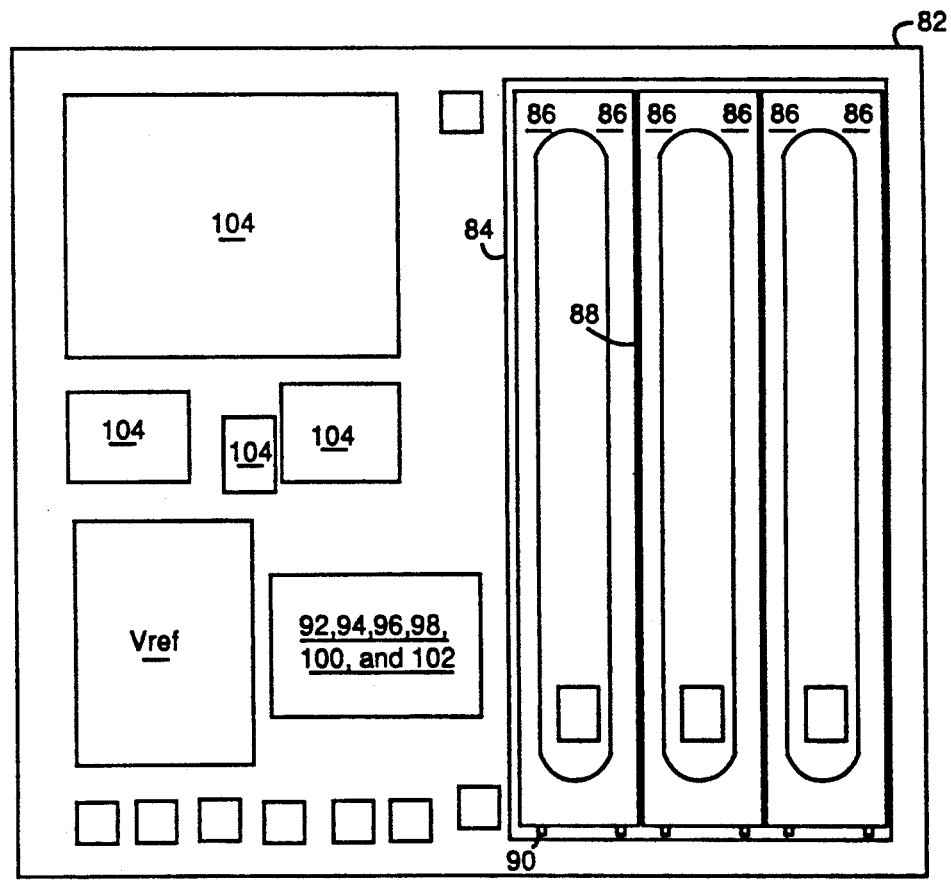
FIG. 4 is a diagram of the chip layout of the power supply chip used in the power supply of FIG. 3.

FIG. 4 illustrates a typical chip layout for chip 82. Because MOSFET 84 is a high-voltage, high-current type, the chip real estate required for its implementation is significant. In the prior art example of FIG. 2, high-voltage transistor 54 would also require a significant amount of chip area. Therefore the elimination of such a transistor as high-voltage transistor 54 in the present invention reduces both die size and manufacturing costs.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A switched mode power supply chip, comprising:
   a first transistor and a second transistor in series with one another and in series with a primary winding of a transformer in a switched mode power supply for switching current from said primary winding and for limiting a voltage which appears at a drain of the first transistor from reaching a drain of the second transistor;
   a low voltage tap connected to a common junction of said drain of the second transistor and a source of the first transistor for drawing a voltage reduced from that appearing at said drain of the first transistor and;
   voltage regulator means connected to the low voltage tap for generating an initial voltage supply from the low voltage tap to supply a start-up power to a pulse modulator means for controlling the first and second transistors to regulate an output from said transformer, wherein a secondary of said transformer may thereafter supply power to said pulse modulator means once said output regulation is established.

2. The chip of claim 1, wherein: the first transistor is a junction field effect transistor (JFET) with a grounded gate and the second transistor is an insulated gate field effect transistor (IGFET) with a grounded source.

3. The chip of claim 1, wherein:
   the voltage regulator means comprises a third transistor connected to the low voltage tap and a resistor connected for pulling up a gate of said third transistor and a voltage comparator having an output coupled to said gate of said third transistor for maintaining a regulated voltage at a source of said third transistor as sensed by a pair of inputs of said comparator connected to a voltage reference and a sample of said regulated voltage.

4. The chip of claim 1, wherein:
   the first transistor is a junction field effect transistor (JFET) with a grounded gate and the second transistor is an insulated gate field effect transistor (IGFET) with a grounded source; and the voltage regulator means comprises a third transistor connected to the low voltage tap and a resistor connected for pulling up a gate of said third transistor and a voltage comparator having an output coupled to said gate of said third transistor for maintaining a regulated voltage at a source of said third transistor as sensed by a pair of inputs of said comparator connected to a voltage reference and a sample of said regulated voltage.

5. A power supply, comprising:

rectifier means for producing a high voltage DC from an AC power input;

filter capacitor means connected to an output of the rectifier means for smoothing said high voltage DC from the rectifier means;

transformer means having a primary winding connected to the rectifier and filter capacitor means and at least one secondary winding connected to a power supply output and a bias supply output for producing an isolated DC output and chip bias voltages from said high voltage DC; and integrated circuit means connected to said primary winding for switching said high voltage DC through said primary winding of the transformer means such that said isolated DC output and chip bias voltages are regulated in said secondary windings, the integrated circuit means including:

a junction field effect transistor (JFET) connected in series with said primary winding with a gate connected to a ground of the power supply such that a drain connected to said high voltage DC through said primary winding of the transformer means prevents a voltage equal to said high voltage DC from appearing at a source of said JFET;

an insulated gate field effect transistor (IGFET) connected in series with said primary winding and said JFET with a gate, a source connected to said ground and a drain connected to said source of said JFET;

pulse width modulator (PWM) means having an output connected to said IGFET gate for driving said IGFET in response to a voltage sampled from said isolated DC output; and first voltage regulator means having an input connected to said source of said JFET and an output connected to said PWM means for supplying an initial operating current to said PWM means from a voltage available at said source of said JFET until the transformer means operates to produce said chip bias voltages which thereafter supply power to said PWM means for continued operation.

6. The power supply of claim 5, wherein the integrated circuit means further comprises:

second voltage regulator means having an input connected to one of said secondary windings and an output for supplying an after-start-up operating current to said PWM means from said isolated chip bias voltage, wherein power to said PWM means from the first regulator means is substituted by the second voltage regulator means.

* * * * *